April 29, 1952     A. B. ST. HILAIRE     2,594,364
APPARATUS FOR THE MANUFACTURE OF PHONOGRAPHIC DISKS Filed Aug. 1, 1946     4 Sheets-Sheet 1

INVENTOR
ALBERT B. St. HILAIRE
BY
Pennie, Edmonds, Morton Barrows
ATTORNEYS

April 29, 1952  A. B. ST. HILAIRE  2,594,364
APPARATUS FOR THE MANUFACTURE OF PHONOGRAPHIC DISKS
Filed Aug. 1, 1946  4 Sheets-Sheet 2
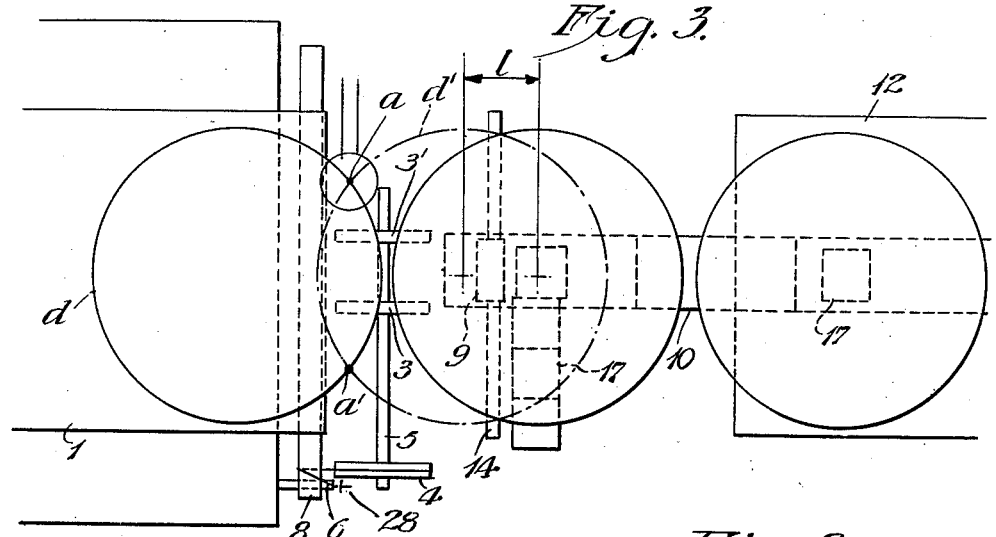
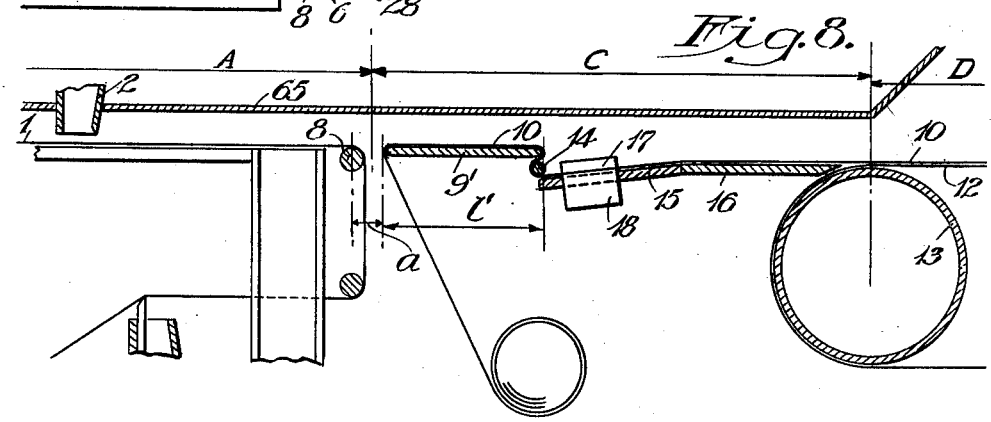
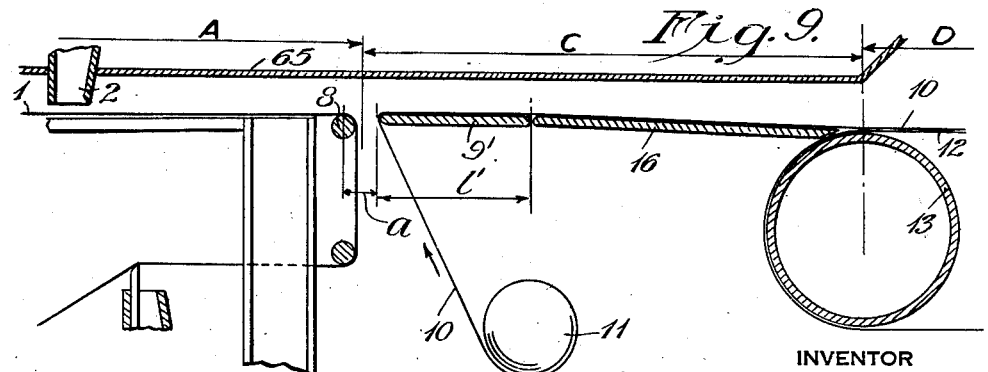
INVENTOR
ALBERT B. St. HILAIRE
BY
ATTORNEYS April 29, 1952   A. B. ST. HILAIRE   2,594,364
APPARATUS FOR THE MANUFACTURE OF PHONOGRAPHIC DISKS
Filed Aug. 1, 1946   4 Sheets-Sheet 3
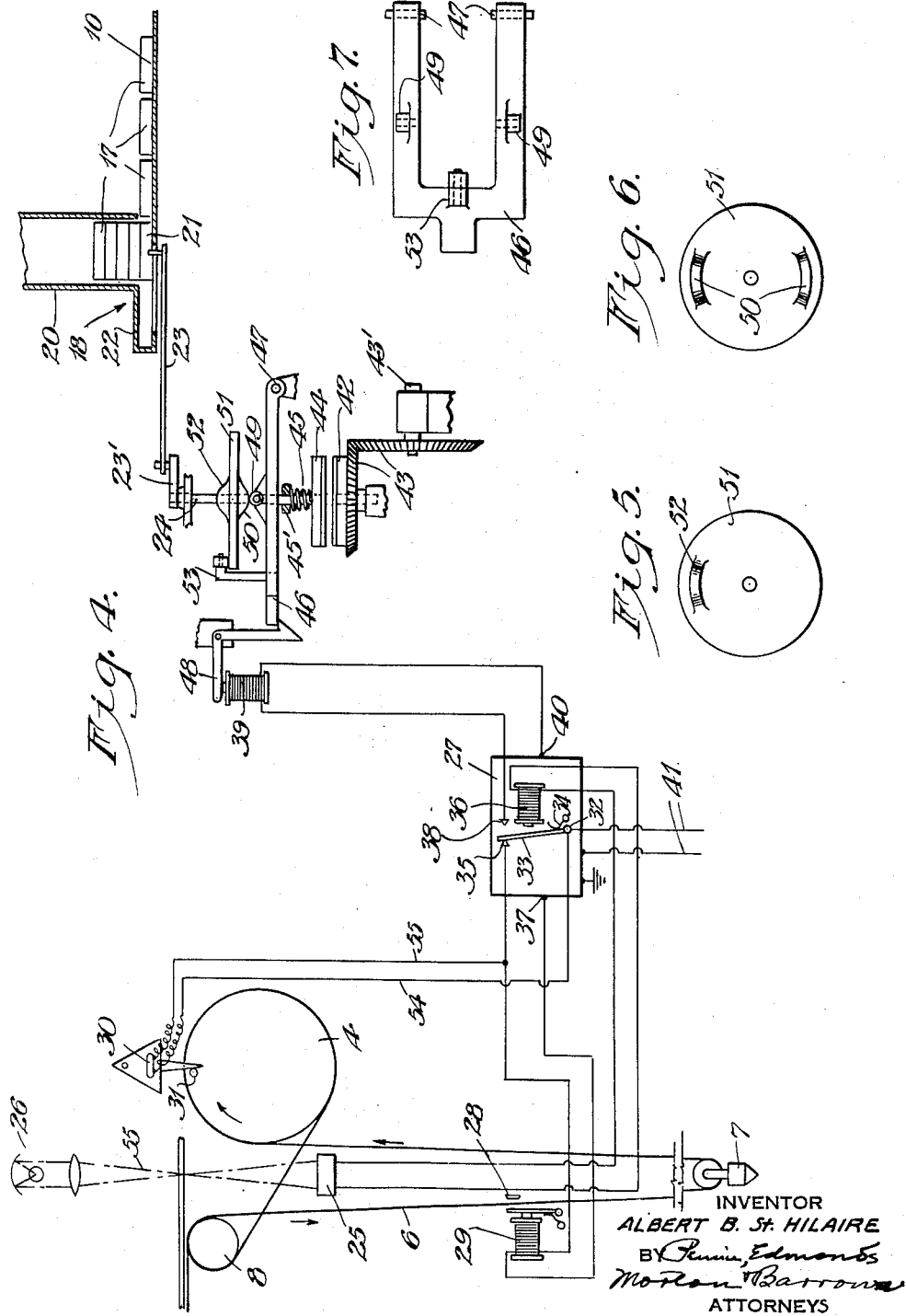
INVENTOR
ALBERT B. St. HILAIRE
ATTORNEYS

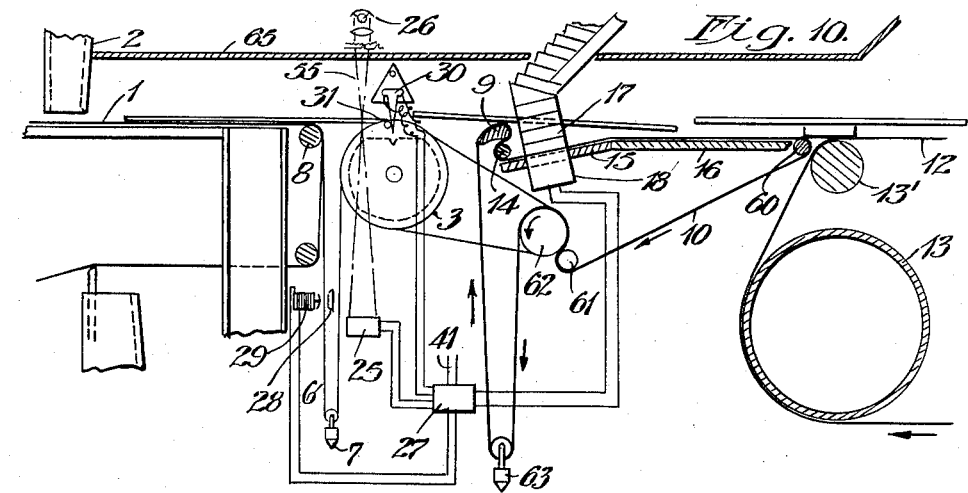
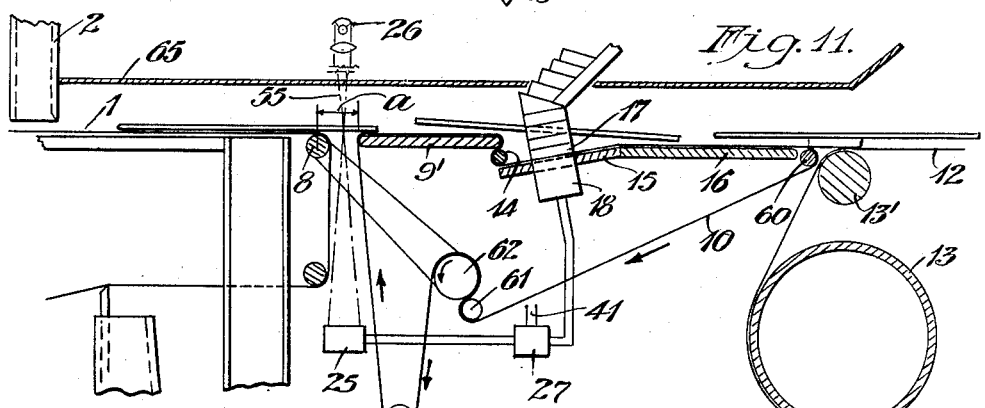
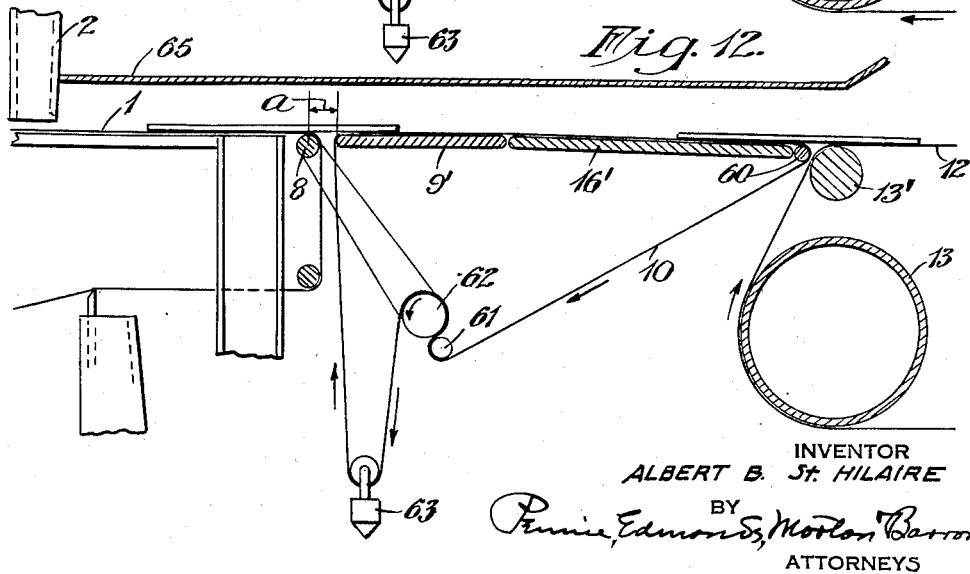

Patented Apr. 29, 1952

2,594,364

UNITED STATES PATENT OFFICE 2,594,364

APPARATUS FOR THE MANUFACTURE OF PHONOGRAPHIC DISKS

Albert B. St. Hilaire, Paris, France, assignor to La Société "Pyral" S. A. R. L., Paris, France, a corporation of France Application August 1, 1946, Serial No. 687,785
In France April 6, 1946

20 Claims. (Cl. 91—55)

This invention relates to the manufacture of phonographic discs and has for its object certain improvements in the method of and apparatus for manufacturing phonographic discs.

An apparatus has been proposed for producing phonographic discs, either compressed or adapted for direct recording, in which a machine for coating blank discs with lacquer or varnish (such as disclosed in my U. S. Patents 2,332,945 and 2,332,946; and Reissue 22,128) is associated with a preliminary drying machine consisting of an endless belt passing through a tunnel fed with air moving countercurrently for drying the coated discs preliminarily. In this form of arrangement, the coating machine and the drying machine are completely independent of one another physically. This requires a manual operation for the transfer of the coated discs from the coating machine to the drying tunnel. A workman must therefore be stationed at the outlet of the coating machine to take hold of each coated disc and to place it on the endless belt at the inlet end of the drying tunnel. During the transfer, the coated discs are exposed to surrounding air containing lint and other foreign particles, such as dust. Some of the lint or other foreign particles tend to deposit on the fresh and still soft coatings. This is highly objectionable because it often impairs the quality of the coated discs.

Investigations confirm my discovery that the blank discs may be coated and dried under such conditions as not to require the manual operation. This may also be done in such a way as to avoid the highly objectionable deposition on the coated discs of lint and other foreign particles in the air in the room in which the coating and drying operations take place.

To this end, in accordance with one feature of the invention, there is inserted between the outlet of the coating machine and the inlet or entrance of the drying machine an automatic transfer device provided with a carrier strip on which the coated disc at the outlet of the coating machine is adapted to rest, the strip then passing over to the conveyor belt of the drying machine. The carrier strip may be endless and move only to the belt or it may be carried along on the belt by the simple adherence produced by the weight of the discs.

According to a further feature of the invention, the carrier strip advances at a speed slightly above the speed of the output of the discs from the coating machine, to provide a final separation of the coated discs from the traveling band of the coating machine without any seam or blister.

According to another feature of the invention, the carrier strip passes over a fixed support located at a distance from the discharge end of the traveling band which is less than one-half of the diameter of the disc and substantially at the level of the operating plane of the traveling band.

In one form of the invention, the coated discs rest directly on the carrier strip.

In another practice, the coated discs rest on the carrier strip or the conveyor belt, or both, through the agency of spaced movable support members. The top of each support member engages the bottom center portion of a coated disc. In this same practice, the support members are brought automatically underneath the disc through an arrangement controlled by a photoelectric cell or any other suitable control. In a particular design of this form of the invention, the transfer device between the coating and drying machines includes a releasing means for pulling the coated discs from the traveling band, in the form of a cam or cams, or a cam drum, which makes a complete revolution for each disc passed out of the coating machine. The cam, cams or cam drum are started through the action of a photoelectric cell or other suitable device and are stopped by the operation of a switch actuated through a member moving in unison with the cam at the end of the complete revolution thereof.

According to a still further feature of this last mentioned form of the invention, the same photoelectric cell or other suitable device may be used for controlling the movement of the disc support members onto the carrier strip.

According to another feature of the same form of the invention, means are provided for feeding the disc support members automatically onto the carrier strip, a mechanism being also provided for starting and stopping these means after they have executed the cycle of operation required for one disc through the agency of the photoelectric cell or other equivalent device.

Further characteristic features and advantages of the invention will appear in the following description and the appended drawings, which illustrate diagrammatically and solely by way of example various forms of the invention.

In the drawings—

Fig. 3 is a plan view corresponding to Fig. 2.

Fig. 4 is a detail view on a larger scale of the automatic control means of certain parts of the arrangements illustrated in Figs. 1 to 3.

Figs. 5 and 6 are detail plan views respectively seen from above and from below of a plate to actuate a clutch mechanism of the arrangement to bring the disc support members onto a carrier strip.

Fig. 7 is a plan view seen from above of a stirrup cooperating with the plate of Figs. 5 and 6 in the clutch mechanism.

Fig. 8 is a longitudinal view, similar to Fig. 1, showing a modified form of apparatus of the invention.

Fig. 9 is a view similar to Fig. 8 showing another modified form of apparatus of the invention; and Figs. 10, 11 and 12 are views similar to Figs. 1, 2, 8 and 9, respectively, showing still further modified forms of apparatus, in which the carrier strip is endless.

A form of the invention is conveniently illustrated in Figs. 1 to 7. Simpler forms of apparatus, which may be sufficient in certain cases, are illustrated in Figs. 8 and 9. A presently preferred form is illustrated in Fig. 10, in conjunction with certain other figures.

The arrangement shown in Figs. 1 to 7 comprises a coating machine A for coating the blank discs with a suitable coating composition, such as lacquer or varnish, means B for the release of the coated discs, means C for leading or transferring the coated discs to the drying machine (the transfer system comprising B and C) and drying machine D arranged according to a particular form of the invention in alignment with the coating machine A.

Figure 1:
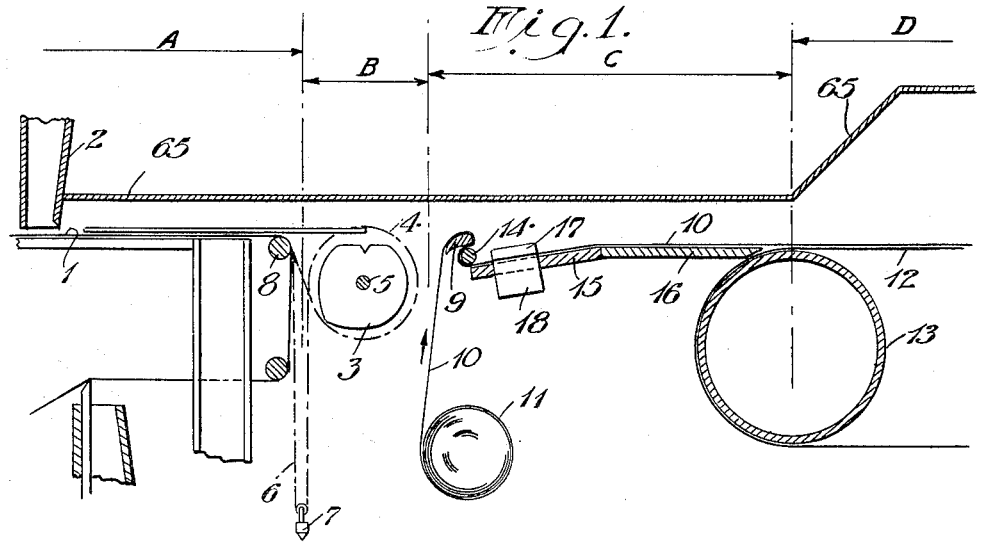
Fig. 1 is a longitudinal diagrammatic view of one form of apparatus of the invention.

Referring first to Fig. 1, the arrangement shown is coating machine A; the discs to be coated are supported on a paper traveling band 1 passing underneath a coating hopper 2 filled to a constant level with lacquer or varnish.

The height of the distributing port in the hopper is adjustable with reference to the surface of the plane to be coated so as to provide a thickness, variable as desired, of the coating. The coating means are preferably of the type disclosed more completely in my above-mentioned patents. It should, however, be understood that this type of coating machine is given solely by way of example and any other coating means adapted to deposit through any suitable means a continuous film of lacquer or varnish, both on the blank disc and on the traveling band, may be used, the details of which do not form a part of the present invention.

At the outlet of the coating machine are release means B for the coated discs, the latter means being considered in this case as a part of the transfer device. The release means comprise a cam drum 3, as shown more particularly in Figs. 1 and 3, the cam being carried along in a continuous rotary movement at a speed slightly above one revolution per disc through the agency of a pulley 4 carried by a shaft 5 also carrying the drum end of a belt 6 and counterweight 7 system shown more particularly in Fig. 2, which system is driven from upper roller 8 provided at the end of the coating machine and over which the traveling band 1 is deflected downwardly.

Cam drum 3 is formed by two twin cams 3, 3', as shown in Fig. 3, the outlines of which are such that the coated disc is slightly raised and drawn at a speed higher than the translational speed of traveling band 1 of the coating machine, as soon as the center of the disc arrives in front of roller 8 adapted to change the direction of band 1.

During the second period of its revolution, the cam drum simply accompanies the coated disc and lays it horizontally over a fixed-position bearing member 9, to be described below, which forms a part of the transfer device for bringing the coated discs to drying machine D.

Means C for leading the coated discs into the drying machine comprise a carrier strip 10, preferably in the form of a paper strip wound off a spool 11 and passing first over the rest or bearing member 9. The bearing member may be a stationary support of suitable outline or it may be a roller the upper generating line of which lies at the level of the table of the coating machine; i. e., at the level of the upper strand of traveling band 1 and at a distance from the axis of roller 8, over which the conveyor band is deflected downwardly, which comprises between 5 and 6 eighths of the diameter of the disc while the horizontal distance between the axis of shaft 5 of release device B and the upper generating line of bearing member 9 is less than the radius of the disc so that when the center of the disc reaches the vertical plane passing through the axis of shaft 5, it cannot rock into open space.

According to one of the features of the invention, the speed of carrier strip 10 is slightly above the translational speed of conveyor band 1 of the coating machine by, say, 3 to 5%.

Carrier strip 10 continues moving over endless belt 12 of drying machine D, the belt being caused to pass over a pair of spaced and supporting drums of which one is shown at 13 on the drawing. Thus it is possible to drive carrier strip 10 through simple adherence thereof to belt 12 under the action of the weight of the coated disc.

Carrier strip 10 passes first, after it has made a change of level around a roller 14, over an inclined ramp 15 and a platform 16 extending into the immediate vicinity of drum 13 carrying belt 12 of the drying machine.

To carrier strip 10 are brought, just above ramp 15, supporting members or blocks 17 for the coated discs so that the latter do not rest directly on the carrier strip. This allows preserving the varnish coating almost completely, which might not occur if the discs were to rest directly on belt 12 as a bead of varnish tends to exist at the edge or rim of the disc and it might otherwise adhere to strip 10. Thus, through the use of such supporting blocks the carrier strip may remain clean and consequently serve again for subsequent operation.

Supporting elements or block supports 17 are distributed over strip 10 gradually, as the coated discs appear, through a slide valve distributor 18 arranged immediately next to bearing member 9. The distributor is adapted to introduce a block support 17 under each coated disc.

The distance between platform 16 and bearing member 9 is less than one-half the diameter of the discs. The platform may be either horizontal or slightly inclined towards the top of drum 13. It is in any case arranged in a manner such that its plane considered as extended geometrically passes underneath the upper edge of bearing member 9 at a distance therefrom which is less than the thickness of the block supports 17.

Carrier strip 10 may have a breadth which is comparatively narrow but it should be sufficient for the transportation of the block supports 17.

Distributor 18 for the block supports may be of the type shown in greater detail in Fig. 4. The block supports are stacked in a sloping channel or trough 19 (see also Fig. 2) terminating in a channel 20 vertical to ramp 15. At the lower end of the channel is a push or slide member 21 adapted to recede inside a lateral recess 22. This pushing or sliding member or slide valve is adapted to urge block supports 17 behind one another and may be operated through a system including a connecting rod 23 and a crank 23' actuated by a rotary shaft 24 the rotation of which is controlled as disclosed hereinafter in further detail.

The purpose of sloping channel 19 is to prevent too considerable a pressure, due to the weight of superposed block supports, from acting on push or slide member or valve 21, which would increase the stress to be provided by the slide valve for urging out of the feed channel 20 the lowermost of the stacked block supports with a view to deliver it when required onto carrier strip 10. As apparent in Fig. 4, block supports 17 push one another until the last is brought onto carrier strip 10. Drying machine D may be formed in part by a drying tunnel fed with air devoid of lint and dust. As disclosed above and according to one of the features of the invention, the drying tunnel is arranged in alignment with the coating machine A. In addition, A, B, C and D are preferably enclosed in a casing or cover to prevent ingress of lint or dust.

The level of driving belt 12 passing through the tunnel is at the same height as platform 16. As stated above, belt 12 serves for driving carrier strip 10 which leads the coated discs from the coating machine to the drying tunnel.

Belt 12 may be given a breadth slightly above that of the discs, but it could also be reduced to the breadth of carrier strip 10.

The translational speed of belt 12 is slightly above the translational speed of conveyor band 1 of the coating machine, say by 3 to 5%.

Figure 2:
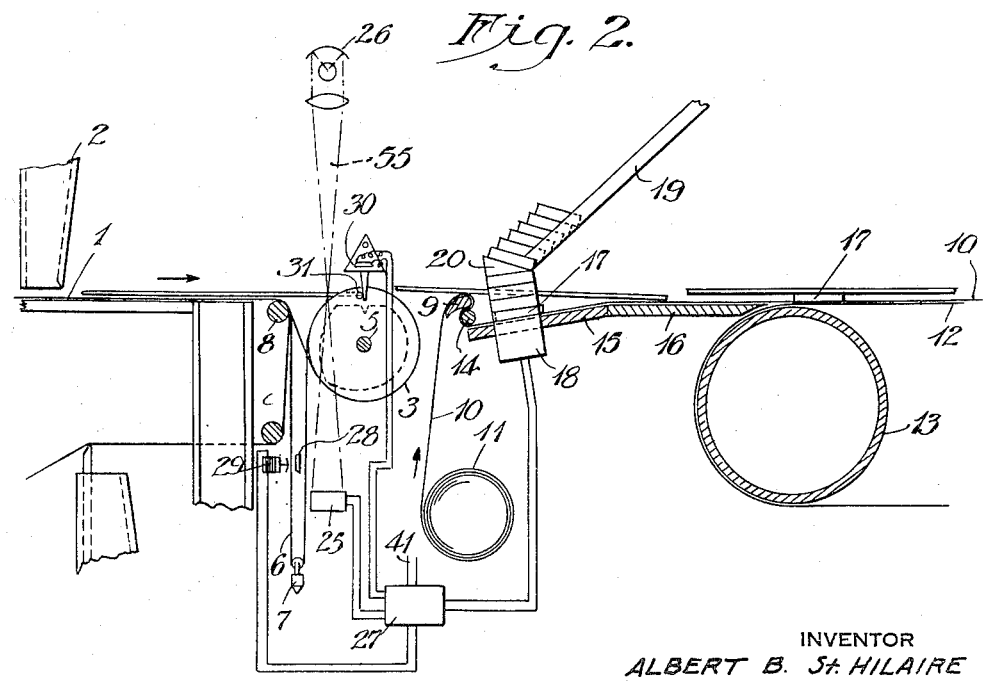
Fig. 2 is a more complete side elevational view of the same form of apparatus, showing automatic control means for certain parts of the arrangement illustrated in Fig. 1.

In order to provide for the synchronism and automatic control of the different moving parts of the arrangement, a photoelectric cell 25 may be used, as illustrated in Figs. 2 and 4, which may be illuminated by a reflector or projector 26 and ensures through a relay 27 both the synchronism of the rotation of release drum 3 and the synchronism of the distribution of block supports 17 with the arrival of successive coated discs.

For executing the first synchronization considered, the speed of rotation of pulley 4 is established so as to be slighty above that corresponding exactly to one revolution per record discharged by the coating machine. To this end, pulley 4 has a peripheral speed slightly higher than the speed of carrier band 1.

The cam drum is stopped in a position termed its starting position, corresponding to the positioning of a coated disc the foremost point of which is located in the vertical plane of the axis 5 of the drum, as shown in Figs. 1, 2 and 3. The drum is stopped in this position by holding fast the slack strand of belt 6 by means of clamping means 28 submitted to the action of an electromagnet 29, as shown more particularly in Figs. 2 and 4, the fastening being performed when the electromagnet is de-energized.

The passage of current through the electromagnet is switched off through a mercury switch 30 when the latter is rocked through a pin 31 carried by pulley 4 controlling cam drum 3. The energization of electromagnet 29 is thus switched off exactly at the moment at which the cam drum has finished its preceding revolution and has returned into its starting position. This may be operated through an adjustment of the location of pin 31.

As apparent in Fig. 4, the two terminals of the mercury switch 30 are connected respectively on one hand with the terminal 32 of an armature 33, urged by a spring 34, of a relay 27 and on the other hand with one of the terminals 35 against which the armature is adapted to rest.

Coil 36 of relay 27, which controls armature 33, is electrically connected with photocell 25, which is in turn submitted to the action of light emitted by projector 26.

Furthermore, electromagnet 29, which controls clamping means 28, is connected on one hand with terminal 35 cooperating with armature 33 of relay 27 and on the other hand it is grounded at 37.

Relay coil 36 includes also another terminal 38 cooperating with armature 33 and connected with one of the terminals of an electromagnet 39 acting on the clutch mechanism for the distributor of block supports 17; the other terminal of electromagnet 39 is grounded at 40. Relay 27 is fed through wires 41 from the mains, not shown.

By way of example, an arrangement will now be described which is controlled by electromagnet 39 for the automatic starting and stopping of the distributor of block supports 17 through the agency of rotary shaft 24 and of the above disclosed system comprising connecting rod 23 and crank 23'.

The arrangement considered includes a clutch, one plate 42 of which is constantly driven by a pair of bevel gears 43 through a rotating shaft 43'. The other clutch plate 44 is integrally secured to rotary shaft 24 and is submitted to the action of a spring 45 inserted between clutch plate 44 and a bearing 45' provided therefor; a stirrup or U-shaped device 46, the ends of the arms being pivotally secured at 47, and between the arms of which shaft 24 is adapted to pass freely, may be displaced vertically along its axis with clutch plate 44. The free end of pivoting stirrup 46 is used to maintain the means for feeding block supports 17 in an inoperative position by way of the hook-shaped end of a bent pivoting member 48 adapted to be controlled by the armature of electromagnet 39. Pivoting stirrup 46 (Fig. 7) carries on each arm a horizontal roller 49 through which it may engage diametrically opposed lateral bosses 50 on the underside of a plate 51 integrally secured to shaft 24. Plate 51 carries, furthermore, on its upper surface a boss 52 adapted to engage a horizontal roller 53 carried by stirrup 46 (Figs. 5 and 6).

It is apparent from the preceding description that when electromagnet 39 is energized, its armature or plunger urges the adjacent or upper end of pivoting member 48 upwardly, which in turn moves the lower end inwardly, thus releasing clutch holding stirrup 46; clutch plate 44 then engages clutch plate 42 and shaft 24 is rotated. This rotation causes crank 23' and connecting rod 23 to move so that lowermost block 17 of the superposed blocks located in the channel 20 is moved onto carrier strip 10.

The rotation of shaft 24, controlling the forward movement of block 17, after ¾ of a revolution, brings boss 52 of plate 51 into engagement with roller 53 which has for its result a rising movement of stirrup 46, thereby returning the stirrup to its locked position, as shown in Fig. 4. Under such conditions, when lower bosses 50 on plate 51 arrive in their turn, i. e., ¼ of a revolution after this, into engagement with rollers 49 of stirrup 46, plate 51 is raised and therewith shaft 24 and clutch plate 44. The arrangement for feeding support blocks 17 is thus stopped exactly after one entire revolution. This cycle occurs at each energization of electromagnet 39.

The energization and de-energization of photocell 25 times all these movements, to wit the starting and stopping of release cam drum 3, and the starting and stopping of the means feeding block supports 17 onto carrier strip 10.

The light beam 55 which is to impinge on photocell 25 should be concentrated at one of the intersecting points $a$ and $a'$, shown in Fig. 3, of the circles defining the perimeter of the discs in the two successive positions illustrated and corresponding:

(a) To the moment at which the foremost point of a disc lies in vertical register with the axis 5 of drum 3, as shown in full-drawn lines at $d$;

(b) To the moment at which the center of the disc, which has not yet reached the axis of the distributor of block supports 17 for the discs, lies at a distance $l$, as shown in Fig. 3, from said axis, such that the time required for travelling over said distance $l$ may be equal to the time required for a block support to progress from its starting position in distributor 18 up to and under the center of a disc, the latter position of the disc being shown in dot and dash lines at $d'$.

When a disc reaches light beam 55 at its concentration points $a$, $a'$, the light beam is cut off and the photocell is no longer energized, so that coil 36 is no longer energized and attracts armature 33 no longer. This provides for the flow of current into electromagnet 29 through one wire 41, terminal 32, armature 33, terminal 35, electromagnet 29, terminal 37 and the other wire 41, which results in the release of clamping means 28 and consequently of the slack strand of belt 6 of cam drum 3 which may then turn one revolution.

Lastly, as long as the cam drum has not made a complete revolution, it is a matter of indifference that light impinges again on the photocell because rocking mercury switch 30 remains operative and consequently the energizing current of electromagnet 29, controlling the release of clamping means 28, can no longer pass through terminal 35 of relay 27 and must pass through the following circuit: a wire 41, terminal 32, connecting wire 54, mercury switch 30, wire 55, electromagnet 29, terminal 37 and the other wire 41.

Therefore, it is only when pin 31 has caused mercury switch 30 to rock that the current feeding electromagnet 29 is switched off and the spring urged armature of the latter will again hold fast at 28 the flat strand of belt 6 which has for its action a stopping of the rotation of the cam drum.

When the disc enters position $d'$ at a distance $l$ of the axis of the distributor of block supports 17, light beam 55 is restored for operating photocell 25 without any modification as disclosed as concerns the rotation of cam drum 3 as long as the latter has not finished its complete revolution. Electromagnet 39 is energized through the following circuit: a wire 41, terminal 32, terminal 38 of relay 27, electromagnet 36 being energized through the illumination of the photocell 25 and attracting therefore its armature 33; the circuit continues through electromagnet 39, terminal 40 and the other wire 41; the energization of electromagnet 39 has for its action as disclosed before to start the operation of the means feeding block supports 17 underneath the center of the coated discs on carrier strip 10.

The operation of the arrangement described above in a particular form of practice of the invention is as follows:

When the blank disc carried along by conveyor band 1 of the coating machine has been coated underneath hopper 2 and appears with its foremost point in front of the axis 5 of cam drum 3, as shown at $d$ in Fig. 3, the coated disc cuts off beam of light 55 falling on photocell 25.

Through the operation of relay 27 and of electromagnet 29, the slack strand of belt 6 controlling the cam drum is released as disclosed; rotation of the cam drum may therefore take place while the discs continue progressing horizontally.

The cams are located in a manner such that they come into contact with the bottom of the disc as soon as the center of the disc reaches a position in vertical register with the axis of roller 8, which changes the direction of travel of conveyor band 1. Cams 3 then raise and advance the coated disc at an increased speed above that of the conveyor band 1 and allow the front portion of the disc to rest on bearing member 9, and hence on carrier strip 10, before the center of the disc passes through one half of the horizontal space between roller 8 and bearing member 9. During this period and as long as the action of the cams is continued, the varnish or lacquer covering the rear of the discs is gradually separated from the varnish or lacquer laid on adjacent portions of conveyor band 1. If the varnish film is not entirely broken, the latter is at least considerably stretched and is stuck to the conveyor band during the short period following the placing of the front of the disc onto bearing member 9 but before the beginning of the driving action of carrier strip 10 on the disc, which carrier strip moves over the bearing member at a speed which is slightly above that of the conveyor band 1.

This driving action of the carrier strip begins only when the center of the disc reaches the middle of the interval or space between the roller 8 and bearing member 9. As soon as the center of the disc reaches this point, carrier strip 10, moving over bearing member 9, begins driving the disc at a speed higher than that of conveyor band 1 and separates in a final manner without any seam or blister the coated disc from the varnish film remaining adherent to the conveyor band.

When the center of the coated disc arrives in front of bearing member 9, the disc rocks or dips slightly and its front portion bears against platform 16 and leaves a certain free space between it, the disc, and inclined ramp 15, into which space there my be inserted underneath the disc a block support 17.

The placing of the block support under the coated disc begins, as illustrated above, at the moment the disc has advanced to the point where light beam 55, concentrated at $a$ or $a'$, impinges again on photocell 25; the current from the photocell acts through the agency of relay 27 under the above described conditions; distributor 18 then places block support 17 onto carrier strip 10 on ramp 15 at the very moment at which the center of the disc arrives above the block support.

The block support is carried along by carrier strip 10 and rides up ramp 15 until it engages the center portion of the bottom of the disc. The block support raises the disc and rocks slightly therewith as they arrive on platform 16. The rear of the coated disc rises and clears bearing member 9 and carrier strip 10 passing over the same.

With a sufficiently narrow carrier strip and a correspondingly arranged bearing member, which should be slightly narrower than the carrier strip shown in Fig. 3, the carrier strip cannot be soiled either at the moment at which the front portion of the coated disc comes into contact with the bearing member or at the moment at which the rear portion moves off same.

The only soiling which may occur is that which may be produced when the coated disc is rocked forwardly but this is very inconsiderable and does not prevent the re-use of carrier strip 10, which is wound on a take-up reel located at the discharge end of the drying tunnel, unless its immediate re-use is provided under the form of an endless carrier strip.

Best results are obtained when the coated discs are not deformed under the action of varnish solvents, which is the case for example when the blank discs are formed of metal. On the contrary, with cardboard blank discs in particular, the superficial moistening produced by the varnish solvents which has been laid on them produces a curvature of the discs which impairs the action of cams 3. It is possible in this case to make use of an arrangement which may be a little simpler than the above disclosed arrangement inasmuch as the cam drum is omitted with the automatic control means described, so as to retain eventually only the part relating to the automatic feed of block supports 17 underneath the discs in the preliminary drying machine. Such a simplified arrangement is illustrated in Fig. 8.

In this case, the arrangement includes, as chief component parts, coating machine A, the arrangement C for feeding the coated discs to the preliminary machine or tunnel and the preliminary drying machine or tunnel D itself.

As concerns the coating machine A and the preliminary drying machine D, they may be designed in the same manner as in the preceding example; or they may be of any other suitable type.

As for the arrangement C to feed the coated discs to the preliminary drying machine D, it is modified as follows in order to take into account, in particular, the omission of the release device B in the form of cam drum 3. Bearing member 9 is replaced by a small plate 9'; the upper portion of which is in alignment with the table of the coating machine.

The distance $a$ separating the axis of roller 8 in the coating machine and the beginning of the flat portion of plate 9' may be less than one half the diameter of the discs so that no rocking thereof into open space may occur.

Furthermore, the length of plate 9' is at least equal to one half the diameter of the discs minus one half the distance $a$ separating roller 8 from the plate.

Over plate 9' is adapted to move, as over bearing 9, carrier strip 10 which after a sudden change in level produced by roller 14, engages inclined ramp 15 and platform 16 leading the carrier strip onto drive belt 12 in the preliminary heating machine or tunnel D.

As before, carrier strip 10 is carried along through its adherence to belt 12 produced by the weight of the coated discs, at a speed slightly higher than the speed of progress of the conveyor band in the coating machine, the increase in speed being about 3 to 5%.

Also, as in the preceding example, distributor 18 for feeding block supports 17 underneath the center of each disc is provided; the distributor may be designed in the same manner as that described hereinabove with reference to the preceding form of the invention and it may also be controlled by a photocell system similar to that disclosed above with a view to ensuring synchronism between the distribution of the block supports 17 and the entrance of the coated discs onto feeding device C.

In this case, light beam 55, which is to impinge on photocell 25, should be concentrated at a point on the circle defined by the perimeter of a disc at the moment at which the center of the disc has not yet reached the axis of distributor 18 of the block supports and is located at a distance $l$ thereof (see Fig. 3) such that the time required by the disc for moving over said distance $l$ may be equal to the time taken by block support 17 for arriving under the center of the record, starting from the beginning of operation of the distributor 18; this latter position of the record is that illustrated in dot-and-dash lines in Fig. 3 at $d'$ in the first form of execution. In the present case, the photocell has not been illustrated for the sake of clarity in Fig. 8, but the wiring diagram is designed in a manner similar to that disclosed hereinabove with reference to the preceding form of execution with the difference merely that the part relating to the control of the cam drum 3 is omitted.

The distributor 18 is started through the appearance or disappearance of the cell current according as to whether the concentration point or focus of the beam has been adjusted on the rear or on the front arc of the circle considered in the preceding paragraph.

The operation of the above described arrangement is as follows:

When a disc driven by conveyor band 1 of the coating machine is coated and its front end begins to progress over plate 9', the lower part of the front periphery of the coated disc slides onto carrier strip 10 which, as disclosed above, advances at a translational speed slightly above that of the conveyor band 1 and this sliding continues until the moment at which the center of the disc reaches the middle of space $a$ separating roller 8 in the coating machine from the front edge of plate 9'.

At this moment, carrier strip 10 assumes a predominating action and drives the coated disc which is thus carried along at a speed higher than the speed of conveyor band 1. Under such conditions, the varnish covering the rear portion of the record is separated gradually from the varnish laid on conveyor band 1. The final breaking of the varnish film is produced at the moment at which the conveyor band 1 makes its change in direction downwardly over roller 8, the breaking being performed without any seam or blister by reason of the previous drawing out of the varnish film.

As soon as the center of the coated disc has reached the end of plate 9', the disc rocks slightly forward and its lower front part bears against platform 16 and leaves underneath it a free space adapted to receive a block support 17 which is released through the appearance or disappearance of the current from the photocell. The block support is carried along the inclined slope of ramp 15 by carrier strip 10, as described with reference to the first example of the invention.

In certain cases, in particular when the lacquer or varnish used shows a superficial pressure such that after a break of the varnish film the varnish bead existing at the periphery of the record does not overlap the underside thereof, as may be the case in particular when discs are used with a cardboard core coated with a varnish having as a base cellulose acetate, and consequently there is no possibility for the varnish to adhere to any plane surface over which the discs may be laid, it is not necessary to use such supporting elements as blocks 17 and the arrangements disclosed above may be considerably simplified while retaining a certain number of their chief features.

Such a simplified arrangement is illustrated in Fig. 9, which, considered as a whole, comprises also, as in the case of Fig. 3, a coating machine A, a means C for feeding the coated discs into a preliminary drying tunnel and the preliminary drying tunnel D.

The only difference with reference to the preceding example resides in the design of the feeding means C. In this case, there is provided again a small plate 9' over which carrier strip 10 advances towards the preliminary drying tunnel, the carrier strip being carried along as before by belt 12 in the tunnel.

But in the present case, the carrier strip, instead of passing over a level changing roller, such as roller 14 shown in Figs. 1, 2, 3 and 8 for leading the carrier strip onto ramp 15, passes directly over a platform 16' lying as in the preceding examples at the level of the table of the coating machine; and the distance $a$ between roller 8 of the coating machine and the edge of plate 9' remains again less than one-half of the diameter of the discs. Similarly, the length $l'$ of the plate is at least equal to one-half the diameter of the record minus one-half of this distance $a$.

The operation of this latter arrangement is substantially identical with that described with reference to Fig. 8 with the difference that the disc is carried along without any support and is borne solely by carrier strip 10 from the discharge end of plate 9' to belt 12 in the preliminary drying tunnel.

The breadth of carrier strip 10 may be less than the diameter of the disc if belt 12 in drying tunnel D is itself broader than the disc. On the contrary, if the belt in the tunnel has a breadth which is smaller than the diameter of the disc, carrier strip 10 should of necessity assume a breadth at least equal to the diameter of the disc.

A presently preferred form of apparatus is illustrated in Fig. 10, taken in conjunction particularly with Figs. 1 to 7 inclusive, which show the transfer mechanism in some detail. The apparatus of Fig. 10 differs primarily from the apparatus of Fig. 1, in that carrier strip 10 is arranged in endless form. A given portion of the carrier strip moves to conveyor belt 12 to discharge a coated disc on a block support 17 onto the conveyor belt. The carrier strip portion then returns to receive another block support and coated disc without, however, passing through the drying tunnel. In this modification, the inlet end of the drying machine is slightly altered so that conveyor belt 12 passes around a pair of superposed drums 13 and 13'. This arrangement is to facilitate near approach of the carrier strip to the conveyor belt, the carrier strip passing over roller 60 located between platform 16 and upper drum 13'. The carrier strip moves downwardly to and around roller 61, around driven drum 62, around pulley weight 63, over the top of fixed-position support 9, downwardly around roller 14, up ramp 15, over the top of platform 16 and back around roller 60. In this arrangement, the carrier strip may be used over and over again. While its composition may be paper of sufficient strength, it may be made of any other desirable flexible material.

It will be clear from the detailed description already given with respect to the apparatus of Figs. 1–7, inclusive, and its operation how this modified form of apparatus may be operated. De-energization of photocell 25 causes cam drum 3 to rotate when a coated disc leaves traveling band 1 and crosses point $a$ or $a'$. Rotation of the cam drum pulls the coated disc away from the traveling band and transfers its forward portion onto the portion of carrier strip 10 moving over support 9. When the center of the coated disc passes over the top of support 9, its forward portion tips toward platform 16. As the rearward portion of the coated disc passes over cam 3 and light beam 55 concentrated at point $a$ or $a'$ again impinges on photocell 25, coil 39 is energized and the clutch mechanism is set into operation so that a block support 17 is pushed over onto carrier strip 10 as it moves up ramp 15, the timing being such that the block support reaches the carrier strip when the center portion of the coated disc is directly above the block support. Forward movement of the carrier strip advances the block support and coated disc upwardly over the ramp and across the top of platform 16. When the block support reaches roller 60 and the carrier strip moves downwardly around the roller, the block support continues in a generally horizontal direction until its forward end portion is brought into frictional engagement with conveyor belt 12. The distance between the vertical axis of roller 60 and the vertical axis of upper drum 13' is less than one half the length of the block support so that the block and its coated disc may be readily transferred as a unit from the carrier strip to the conveyor belt.

Another modified form of apparatus is shown in Fig. 11, which is patterned after that of Fig. 8 and of course Fig. 10 insofar as the arrangement for endless carrier strip 10 is concerned. The apparatus as shown in Fig. 11 is operated as is the apparatus of Fig. 8, described above, except that the coated discs are transferred to the drying machine on block supports 17 carried by endless carrier strip 10, as just described for Fig. 10.

Still another modified form of apparatus is shown in Fig. 12, which is patterned after that of Fig. 9 and of course Figs. 10 and 11 in general, so far as the arrangement for endless carrier strip 10 is concerned. The carrier strip passes over the top of support 9' and thence across platform 16'. The latter two elements may be combined into a single support or platform. The apparatus as shown in Fig. 12 is operated as is the apparatus of Fig. 9, described above, except that the coated discs are carried directly on endless carrier strip 10 to the drying machine.

In order to keep lint and dust or other air-laden foreign particles from depositing on the freshly coated discs, the apparatus as a whole is advantageously enclosed in a casing 65. Removable sections, not shown, may be provided in the casing at desired places for convenient access to the interior parts of the apparatus.

Of course, the arrangements disclosed above and illustrated in the drawings have been given solely by way of example. They may receive certain modifications as to their details of construction without the general scope of the invention being modified thereby. Thus in particular, as disclosed, the coating machine may be of any suitable type different from that disclosed hereinabove; similarly also, the clutch and control means for slide valve distributor 18 may be replaced by any other equivalent system delivering supporting elements out of a container at each energization of electromagnet 39, etc.

In the discussion above, reference is made to the use of a photoelectric cell 25 to operate relay 27, etc. Those skilled in this art will appreciate that what is meant is not only the photocell per se but any auxiliary devices necessary to provide the current required properly to actuate the relay, such as a thyratron tube or tubes and the circuits and connections incident to their use, in the well-known manner. Also, as indicated above, any other suitable device may be substituted for the photo tube to operate the relay. A mechanical, pneumatic, hydraulic, vacuum, etc., device could, of course, be used in conjunction with the movement of the coated discs to operate the relay. In view of what has been disclosed, such modifications will readily occur to those skilled in this art.

The method herein disclosed is claimed in my co-pending application, Serial No. 230,818, filed June 9, 1951, which is a continuation application of my co-pending application, Serial No. 687,784, filed August 1, 1946, now abandoned.

I claim:

1. In a transfer device for transferring, in a generally horizontal direction a succession of flat work pieces from one conveyor to another, the improvement comprising releasing means at the discharge end of the first conveyor for engaging the underside of each flat work piece as it leaves the first conveyor and for releasing, supporting and advancing the flat work piece along its normal path of travel, and carrier means adjacent the release means and charging end of the second conveyor for engaging the under-side of each flat work piece as it leaves the release means and for receiving, carrying and depositing each such work piece on the second conveyor.

2. Apparatus according to claim 1, in which the carrier means includes a carrier strip adapted to support and to advance the flat work pieces in their line of travel between the two conveyors.

3. Apparatus according to claim 2, in which directing means are provided for directing the carrier means downwardly away from the forward portion of the advancing flat work piece to provide an open space between its central under portion and the carrier means for receiving a movable support, and placing means are provided for placing the movable-support in the open space onto the carrier strip under each flat work piece carried thereby.

4. Apparatus according to claim 1, in which directing means are provided for directing the carrier means downwardly away from the forward portion of the advancing flat work piece to provide an open space between its central under portion and the carrier means for receiving a movable support, and placing means are provided for placing the movable-support in the open space onto the carrier means under each flat work piece carried thereby.

5. Apparatus according to claim 4, in which starting means are provided for starting operation of the movable-support placing means when each flat work piece travels a predetermined distance in its path of travel.

6. Apparatus according to claim 1, in which the carrier means includes a fixed-position bearing member disposed between the release means and the second conveyor, and a carrier strip movable over the bearing member for carrying and advancing the flat work pieces in their path of travel between the release means and the second conveyor.

7. Apparatus according to claim 1, in which the carrier means includes a fixed-position bearing member disposed between the release means and the second conveyor, a carrier strip movable over the bearing member to the second conveyor, directing means below the top of the bearing member for directing the carrier strip to a level below that of the bearing member to provide an adjacent space between the top portion of the carrier strip so lowered and the path of travel level of the flat work pieces and between the top portion of the bearing member and the second conveyor for accommodating a movable-support for the flat work pieces.

8. Apparatus according to claim 7, in which the transfer device includes placing means for placing a movable-support into the latter space onto the carrier strip.

9. Apparatus according to claim 1, in which the transfer device includes starting means for starting operation of the release means when each flat work piece reaches a predetermined point in its path of travel.

10. Apparatus according to claim 1, in which directing means are provided for directing the carrier means downwardly away from the forward portion of the advancing flat work piece to provide an open space between its central under portion and the carrier means for receiving a movable support, and the transfer device includes: placing means for placing the movable-support in the open space onto the carrier means under each flat work piece carried thereby; starting means for starting operation of the release means when each flat work piece reaches a predetermined point in its path of travel; and starting means for operation of the movable-support placing means when each flat work piece travels a predetermined distance in its path of travel.

11. In a transfer device for transferring a succession of flat work pieces from one conveyor to another, the improvement comprising release means and carrier means for the flat work pieces; the release means for engaging and withdrawing each flat work piece from the first conveyor; the carrier means for carrying each flat work piece from the release means to the second conveyor; a fixed-position bearing member disposed between the release means and the second conveyor; a carrier strip movable over the bearing member to the second conveyor; directing means below the top of the bearing member for directing the carrier strip to a level below that of the top of the bearing member; an inclined ramp extending upwardly from the directing means toward the second conveyor for supporting the carrier strip; the directing means and the inclined ramp providing a space between the lowered portion of the carrier strip over the ramp and the path of travel of the flat work pieces for accommodating a movable-support for the work pieces.

12. Apparatus according to claim 11, in which a relay is connectible with a primary source of current; an auxiliary circuit connects the relay and an electromagnet associated with the release means for stopping and starting operation of the same; and means for operating the relay automatically as each flat work piece reaches a predetermined point in its path of travel.

13. Apparatus according to claim 12, in which the means for operating the relay automatically includes a photo-electric cell disposed to one side and a source of light directed toward the cell disposed to the other side of the path of travel of the flat work pieces as they are transferred from the first conveyor to the second conveyor.

14. Apparatus according to claim 11, in which a relay is connectible with a primary source of current; an auxiliary circuit connects the relay and an electromagnet associated with the release means; the auxiliary circuit being divided into two branches, one adapted to stop and the other to start operation of the release means; and means for operating the relay and hence the electromagnet automatically as each flat work piece reaches a predetermined point in its path of travel.

15. In a transfer device for transferring a succession of flat work pieces from one conveyor to another, the improvement comprising release means; carrier means and placing means; the release means for engaging each flat work piece and releasing it from the first conveyor; the carrier means for carrying each flat work piece from the release means to the second conveyor; a fixed-position bearing member disposed between the release means and the second conveyor; a carrier strip movable over the bearing member to the second conveyor; directing means below the top of the bearing member for directing the carrier strip to a level below that of the top of the bearing member; an inclined ramp extending upwardly from the directing means toward the second conveyor for supporting the carrier strip; the directing means and the inclined ramp providing a space between the lowered portion of the carrier strip over the ramp and the path of travel of the flat work pieces for accommodating a movable-support for the flat work pieces; and the placing means for placing a movable-support into the space onto the carrier strip under each flat work piece as it moves over the movable-support.

16. Apparatus according to claim 15, in which a relay is connectible with a primary source of current; an auxiliary circuit connects the relay and an electromagnet associated with the placing means for starting and stopping operation of the same; means for operating the relay and hence the electromagnet automatically as each flat work piece reaches a predetermined point in its path of travel.

17. Apparatus according to claim 16, in which the means for operating the relay automatically includes a photo-electric cell disposed to one side and a source of light directed toward the cell disposed toward the other side of the path of travel of the flat work pieces as they are transferred from the first conveyor to the second conveyor.

18. Apparatus according to claim 15, in which a relay is connectible with a primary source of current; an auxiliary circuit connects the relay and an electromagnet associated with the release means for stopping and starting operation of the same; another auxiliary circuit connects the relay and an electromagnet associated with the placing means for starting and stopping operation of the same; and means for operating the relay and hence the electromagnets automatically as each flat work piece reaches predetermined points in its path of travel.

19. Apparatus according to claim 18, in which the means for operating the relay automatically includes a photo-electric cell disposed to one side and a source of light directed toward the cell disposed to the other side of the path of travel of the flat work pieces as they are transferred from the first conveyor to the second conveyor.

20. Apparatus according to claim 15, in which a relay is connectible with a primary source of current; an auxiliary circuit connects the relay and an electromagnet associated with the release means for stopping and starting operation of the same; the auxiliary circuit being divided into two branches, one for stopping and the other for starting operation of the release means; another auxiliary circuit connects the relay and an electromagnet associated with the movable-support placing means for starting and stopping operation of the same; and means for operating the relay and hence the electromagnets automatically as each coated disc reaches predetermined points in its path of travel.

ALBERT B. ST. HILAIRE.

REFERENCES CITED

The following references are of record in the file of this patent:

UNITED STATES PATENTS

| Number | Name | Date |
|---|---|---|
| 1,273,796 | Bleile | July 23, 1918 |
| 1,703,881 | Greer | Mar. 5, 1929 |
| 2,015,187 | Mayer | Sept. 24, 1935 |
| 2,277,426 | Wolf et al. | Mar. 24, 1942 |
| 2,332,946 | St. Hilaire | Oct. 26, 1943 |
| 2,403,673 | Mead | July 9, 1946 |
| 2,429,130 | Hockman et al. | Oct. 14, 1947 |